Figure 1:
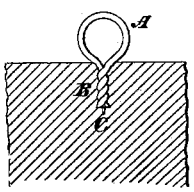

(No Model.)

W. R. CLOUGH.
WIRE SCREW.

No. 363,597.  Patented May 24, 1887.

WITNESSES:
Gustave Dieterich
William Goebel

INVENTOR
William R. Clough,
BY
Ellison & Gill.
ATTORNEYS.

UNITED STATES PATENT OFFICE.

WILLIAM R. CLOUGH, OF NEW YORK, N. Y.

WIRE SCREW.

SPECIFICATION forming part of Letters Patent No. 363,597, dated May 24, 1887.

Application filed January 22, 1887. Serial No. 225,109. (No model.)

*To all whom it may concern:*

Be it known that I, WILLIAM R. CLOUGH, a citizen of the United States, and a resident of New York, in the county of New York and State of New York, have invented certain new and useful Improvements in Wire Screws, of which the following is a specification.

The invention relates to improvements in wire screws; and it consists, essentially, of a wood-screw formed wholly of wire, and whose single or double spiral thread is composed of the entire thickness of the wire from which the screw is manufactured, suitably twisted or coiled, pointed at the entering end, and provided with a head at the other.

The wood-screw constructed according to my invention possesses many advantages and distinctive characteristics, which will be understood from the following specification, and is adapted for various uses, which will suggest themselves from the description herein contained, which will be directed, principally, to an explanation of the invention as applied to the manufacture of screw eyes, hooks, and like articles.

It is well understood that one of the most important considerations in the manufacture of small screw-eyes and the screws on hooks and similar articles is to so construct them that they will enter a wooden curtain-rod, picture-frame, or other surface, and withstand considerable outward force without losing their position, and this is an object which has never heretofore been accomplished to any satisfactory extent, owing to the fact that the threads on the small wire which it was necessary to use could not be cut sufficiently deep to hold in the wood when strain was put upon the eye. This objection was sought to be remedied by elongating the screw, which unfitted it for use in many instances, and also by using heavy wire for the small screw-eyes, which only increased the evil, since the cost of manufacture was unduly increased and the thick screw would split the wood.

The invention which is the subject of the present application successfully overcomes the foregoing and other objections to the screw-eyes heretofore in use, simplifies and cheapens the manufacture of the goods, and renders possible the production of a screw-eye of thin wire, which will successfully enter the wood without splitting or weakening the binding force of the same or becoming broken or distorted itself, and which cannot be withdrawn by any direct strain less than such an undue and unusual amount as would tear or split the wood.

According to my invention the spiral rib of the screw may be made double or single and given a greater pitch and depth than that of the cut threads on screws now in use, and is far more effective. The screw having the pitch which I am enabled by my invention to give to its thread is of great advantage over the cut threads on the present wood-screws, since thereby the screw may be very quickly inserted into and withdrawn from the wood, saving a great deal of time without impairing its utility or the firmness of its position. The cut threads of wood-screws are necessarily on such a slight angle that the screw must frequently be turned a great number of times before it has been fully embedded, and a large part of this labor and the time required therefor are effectually dispensed with by constructing the screw according to my invention.

The worm or body of the screw made of wire should be of appropriate diameter and rigidity to enter the wood, and when once embedded therein will, owing to the advantageous character of the worm, withstand any usual amount of direct strain without losing its position.

One of the distinguishing features of my present invention is that the double or single thread of the screw, instead of being cut, pressed, or cast, is formed of the entire thickness of the wire from which the screw is made. It is not, I think, necessary to give here a more definite description of the diameter of the worm or body of the screw than to say that it should be equal to about two or two and a half times the thickness of the wire from which it is made, since the worm thus formed would admirably answer the purpose, and is what I recommend; and since, owing to the characteristics of the wire and the methods that might be employed in coiling or twisting it, the diameter of the worm might turn out to be a trifle greater or less than that above given without exceeding a degree which would take it away from my invention, hence in this specification, when the words "appropriate diameter" are made use of in describing the worm or body of the screw, they will have a definite signification as meaning about two or two and one-half times the thickness of the wire, or such departure therefrom as would not unfit the screw for the specific purposes of the invention.

A desirable method of making the wood-screw or screw-eye embodied herein would be to take a single strand of wire, bend or fold it upon itself, and twist or coil the ends of same to form the screw, said ends being suitably pointed, and the bite or loop of the strand being fashioned into an eye or head. When the article is formed by two thicknesses of the wire twisted together, the diameter above given of the worm may be very readily attained and preserved throughout the manufacture, and said worm will have a double spiral rib or thread with a closed eye (incapable of spreading open) at its outer end. Of course, if it should be desired to construct both worm and eye or head, of whatever form, entirely from twisted or coiled wire, this may be done, the entering end of the twisted strand being properly pointed.

It should be noted that the invention is confined to articles which have heretofore been composed of wire having a straight stem, with a cut thread thereon for entering the wood and supporting a head.

My invention is illustrated in the accompanying drawings, in which—

Figure 2:
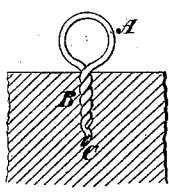
Figure 3:
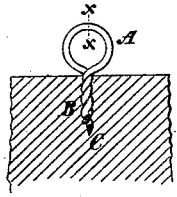
Figure 4:
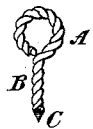
Figure 5:

Figure 1 is a view of a form of my invention in which the worm or body of the screw-eye is composed of coiled or twisted wire terminating in an auger-point. Fig. 2 is a view of a screw-eye in which the worm is composed of the two ends of a single piece of wire twisted together, one of the ends being in advance of the other and both ends having scarf-cut points. Fig. 3 is a like view of same, both ends of the wire forming one continuous scarf-cut point. Fig. 4 is a view of a screw-eye in which the eye and worm are composed of twisted wire terminating in an auger-shaped point, and Fig. 5 is a view of a hook made according to and embodying the invention.

In Figs. 1 to 4, inclusive, A designates the eye, B the worm or body of the screw, and C the point. In Fig. 5 the worm and point are indicated by the letters B C, respectively, the hook-shaped head being represented by the letter D.

The articles illustrated in Figs. 1, 2, 3, and 5 are each formed from a single strand of wire doubled upon itself, the bite or loop of the strand constituting the eye or head, and the two ends of same being intertwisted or coiled, as shown, to form the body of the worm or screw and the spiral ribs which engage the fiber of the wood. It will be observed that each of the articles referred to in this paragraph have a double spiral thread or rib, one being formed by each end or portion of the wire; that the diameter of the screw is equal to about two thicknesses of the wire, and that each of the spiral ribs or threads is formed of the whole or about the whole thickness of the wire from which it is made, and supports and sustains the other spiral rib or thread. The point at the entering end of the worm or screw may be made either before or after the strand or strands of wire have been intertwisted or coiled.

I prefer in the practice of the invention to manufacture the screw having the double thread formed by intertwisting the two ends of a folded strand of wire; but it must not be understood that I confine my invention to the double thread, since I am able to produce a wood-screw made wholly from wire having a single thread, and which will have the appropriate diameter, hereinbefore referred to, fitting it for the purposes of the invention, said diameter having been discovered only after much thought, expense, and experiment. As an illustration of the wood-screw, having a single thread and made wholly from wire, the screw-eye shown in Fig. 3 might be severed at the line $x\ x$ and the two parts thus formed untwisted from each other, producing thereby two single-threaded screws of the designated diameter, the blunt ends of which serving as a hook or adapted to be formed into an eye or head. It is not every diameter of the single-threaded screw which will enter wood and enable it to be used as a screw-eye. In this instance the single-threaded screw has a diameter about equal to two thicknesses of the wire. It leaves the entire thickness of the wire to act as the spiral rib or thread, and at the same time operates as a substantial body for the eye or head without additional support.

What I claim as my invention, and desire to secure by Letters Patent, is—

1. A wire screw made from a single piece of wire, suitably pointed and headed, and twisted to form the spiral thread, the diameter of the body of the screw being equal to about two or two and one-half times the thickness of the wire, substantially as set forth.

2. A double-threaded screw formed by intertwisting strands of wire, pointed at the entering end and provided with a suitable eye or head at the other, substantially as set forth.

Signed at New York, in the county of New York and State of New York, this 21st day of January, A. D. 1887.

WILLIAM R. CLOUGH.

Witnesses:
 CHAS. C. GILL,
 W. A. C. MATTHIE.